US008282985B2

(12) United States Patent
Vaartstra

(10) Patent No.: US 8,282,985 B2
(45) Date of Patent: *Oct. 9, 2012

(54) FLOW-FILL SPACER STRUCTURES FOR FLAT PANEL DISPLAY DEVICE

(75) Inventor: Brian A. Vaartstra, Nampa, ID (US)

(73) Assignee: Mosaid Technologies Incorporated, Ottawa, Ontario (CA)

( * ) Notice: Subject to any disclaimer, the term of this patent is extended or adjusted under 35 U.S.C. 154(b) by 196 days.

This patent is subject to a terminal disclaimer.

(21) Appl. No.: 12/764,607

(22) Filed: Apr. 21, 2010

(65) Prior Publication Data

US 2010/0199486 A1 Aug. 12, 2010

Related U.S. Application Data

(60) Division of application No. 11/507,027, filed on Aug. 21, 2006, now Pat. No. 7,723,907, which is a continuation of application No. 10/314,228, filed on Dec. 9, 2002, now Pat. No. 7,116,042, which is a division of application No. 09/572,079, filed on May 17, 2000, now Pat. No. 6,716,077.

(51) Int. Cl.
*B05D 5/00* (2006.01)
*B05D 5/06* (2006.01)
*H01S 4/00* (2006.01)

(52) U.S. Cl. ........................................ 427/69; 29/592.1

(58) Field of Classification Search ..................... 427/69
See application file for complete search history.

(56) References Cited

U.S. PATENT DOCUMENTS

| | | | | |
|---|---|---|---|---|
| 4,097,889 | A * | 6/1978 | Kern et al. | 257/639 |
| 5,193,137 | A | 3/1993 | Hoshino et al. | |
| 5,314,724 | A | 5/1994 | Tsukune et al. | |
| 5,492,234 | A * | 2/1996 | Fox, III | 216/25 |
| 5,509,840 | A | 4/1996 | Huang et al. | |
| 5,561,343 | A | 10/1996 | Lowe | |
| 5,587,623 | A | 12/1996 | Jones | |
| 5,614,353 | A | 3/1997 | Kumar et al. | |
| 5,619,097 | A | 4/1997 | Jones | |
| 5,658,832 | A | 8/1997 | Bernhardt et al. | |
| 5,808,410 | A | 9/1998 | Pinker et al. | |
| 5,840,465 | A | 11/1998 | Kakinuma et al. | |
| 5,851,133 | A | 12/1998 | Hoffmann | |
| 6,004,179 | A | 12/1999 | Alwan | |
| 6,159,065 | A | 12/2000 | Jung et al. | |

(Continued)

OTHER PUBLICATIONS

Gaillard, et al., "Silicon Dioxide Chemical Vapor Deposition Using Silane and Hydrogen Peroxide," J. Vac. Sci. Technol., B14(4) (Jul./Aug. 1996).*

(Continued)

*Primary Examiner* — Michael Cleveland
*Assistant Examiner* — Francisco Tschen
(74) *Attorney, Agent, or Firm* — Hamilton, Brook, Smith & Reynolds, P.C.

(57) ABSTRACT

A preferred embodiment of the invention is directed to support structures such as spacers used to provide a uniform distance between two layers of a device. In accordance with a preferred embodiment, the spacers may be formed utilizing flow-fill deposition of a wet film in the form of a precursor such as silicon dioxide. Formation of spacers in this manner provides a homogenous amorphous support structure that may be used to provide necessary spacing between layers of a device such as a flat panel display.

11 Claims, 6 Drawing Sheets

U.S. PATENT DOCUMENTS

| | | | | |
|---|---|---|---|---|
| 6,176,077 | B1 * | 1/2001 | Haggander et al. | 60/770 |
| 6,255,772 | B1 | 7/2001 | Cathey et al. | |
| 6,716,077 | B1 | 4/2004 | Vaartstra | |
| 7,116,042 | B2 | 10/2006 | Vaartstra | |

OTHER PUBLICATIONS

Dobson, et al., "Advanced $SiO_2$ Planarization Using Silane and $H_2O_2$, " *Semiconductor International* (Dec. 1994).

* cited by examiner

FLOW-FILL SPACER STRUCTURES FOR FLAT PANEL DISPLAY DEVICE

RELATED APPLICATION(S)

This application is a divisional of U.S. application Ser. No. 11/507,027, filed Aug. 21, 2006, now U.S. Pat. No. 7,723,907 which is a continuation of U.S. application Ser. No. 10/314,228, filed Dec. 9, 2002, now U.S. Pat. No. 7,116,042, issued Oct. 3, 2006, which is a divisional of U.S. application Ser. No. 09/572,079, filed May 17, 2000, now U.S. Pat. No. 6,716,077, issued Apr. 6, 2004. The entire teachings of the above applications are incorporated herein by reference.

BACKGROUND OF THE INVENTION

Flat panel displays, particularly those utilizing field emission display (FED) technology, employ a matrix-addressable array of cold, pointed field emission cathodes in combination with a luminescent phosphor screen. Individual field emission structures are sometimes referred to as vacuum microelectronic triodes. Each triode has the following elements: a cathode (emitter tip), a grid (also referred to as the "gate"), and an anode (typically, the phosphor-coated element to which emitted electrons are directed).

In order for proper display operation, which requires emission of electrons from the cathodes and acceleration of those electrons to a phosphor-coated screen, an operational voltage differential between the cathode array and the screen on the order of 1,000 volts is required. In order to prevent shorting between the cathode array and the screen, as well as to achieve distortion-free image resolution and uniform brightness over the entire expanse of the screen, highly uniform spacing between the cathode array and the screen is to be maintained.

As disclosed in U.S. Pat. No. 6,004,179, entitled, "Methods of Fabricating Flat Panel Evacuated Displays," assigned to Micron Technology, Inc., which is incorporated herein by reference in its entirety, in a particular evacuated flat-panel field emission display utilizing glass spacer columns to maintain a separation of 250 microns (about 0.010 inches), electrical breakdown occurred within a range of 1,100 to 1,400 volts. All other parameters remaining constant, breakdown voltage will rise as the separation between screen and cathode array is increased. However, maintaining uniform separation between the screen and the cathode array is complicated by the need to evacuate the cavity between the screen and the cathode array to a pressure of less than $10^{-6}$ Torr to enable field emission.

Small area displays (for example, those which have a diagonal measurement of less than 3 centimeters) can be cantilevered from edge to edge, relying on the strength of a glass screen having a thickness of about 1.25 millimeters to maintain separation between the screen and the cathode array. Since the displays are small, there is no significant screen deflection in spite of the atmospheric load. However, as display size is increased, the thickness of a cantilevered flat glass screen must be increased exponentially. For example, a large rectangular television screen measuring 45.72 centimeters (18 inches) by 60.96 centimeters (24 inches) and having a diagonal measurement of 76.2 centimeters (30 inches), must support an atmospheric load of at least 28,149 Newtons (6,350 pounds) without significant deflection. A glass screen (also known as a "faceplate") having a thickness of at least 7.5 centimeters (about 3 inches) might well be required for such an application. Moreover, the cathode array structure must also withstand a like force without deflection.

A solution to cantilevered screens and cantilevered cathode array structures is the use of closely spaced, load-bearing, dielectric (or very slightly conductive, e.g., resistance greater than 10 mega-ohm) spacer structures. Each of the load-bearing structures bears against both the screen and the cathode array plate and thus maintains the two plates at a uniform distance between one another. By using load-bearing spacers, large area evacuated displays might be manufactured with little or no increase in the thickness of the cathode array plate and the screen plate.

SUMMARY OF THE INVENTION

A preferred embodiment of the invention is directed to support structures such as spacers or other layers of fixed geometry used to provide a uniform distance between two layers of a device. In accordance with a preferred embodiment, the spacers may be formed utilizing flow-fill deposition of a wet film in the form of a precursor such as silicon dioxide. Formation of spacers in this manner provides a homogenous amorphous support structure that may be used to provide necessary spacing between layers of a device such as a flat panel display.

BRIEF DESCRIPTION OF THE DRAWINGS

Many advantages, features, and applications of the invention will be apparent from the following detailed description of the invention that is provided in connection with the accompanying drawings in which.

DETAILED DESCRIPTION OF THE INVENTION

Preferred embodiments and applications of the invention will now be described with reference to FIGS. 1-11. Other embodiments may be realized and structural or logical changes may be made to the disclosed embodiments without departing from the spirit or scope of the invention. Although the invention is particularly described as applied to spacers for use in a flat panel display, it should be readily apparent that the invention may be embodied in any device or system having the same or similar problems.

Figure 6:
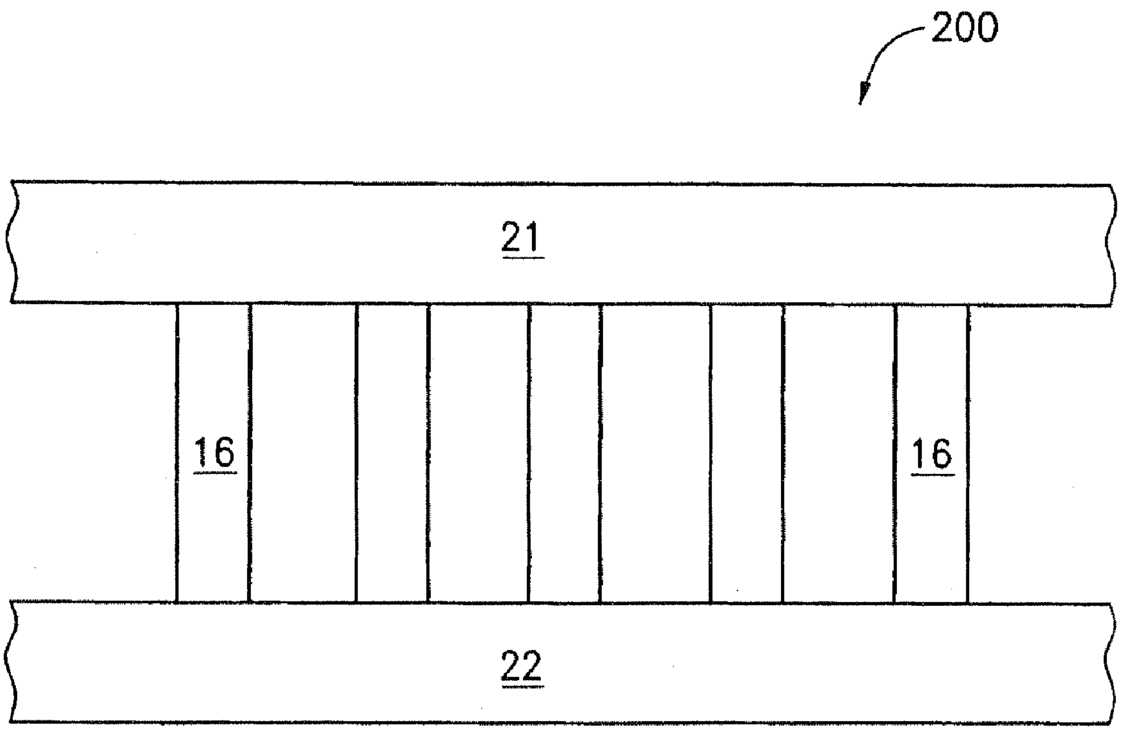

A method in accordance with a preferred embodiment of the invention can be used to form a support structure for use in providing support or maintaining a given distance between two layers of a device. As an illustration, a preferred embodiment of the invention is employed to fabricate a support structure (or other layers of fixed geometry) in the form of one or more spacers 16 used to maintain separation between two layers 21, 22 of a device 200, as shown in FIG. 6. A method of fabricating such a device in accordance with a preferred embodiment of the invention begins with the preparation of the layer (21 or 22) of the device which will initially support the spacer.

Figure 1:
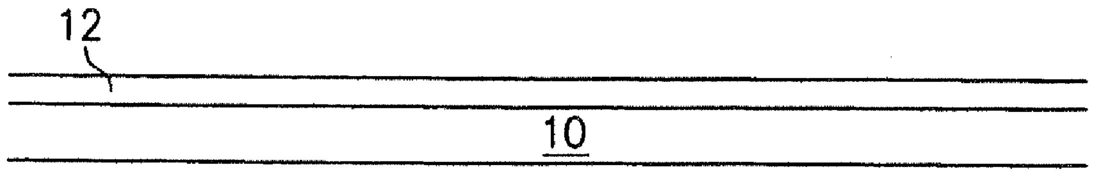
FIGS. 1-6 illustrate a cross-sectional view of a device under fabrication in accordance with a preferred embodiment of the invention.

For the device layer chosen, a substrate 10 of suitable material (e.g., silicon wafer, glass, etc.) is provided, as shown in FIG. 1. In accordance with a preferred embodiment, a photosensitive coating material such as photoresist layer 12 is applied in well-known fashion to the top surface of substrate 10.

In a preferred embodiment, a mask or reticle is used to define regions where the structures will be formed. An intense light source is then provided to expose certain portions of layer 12 and after developing the photoresist, openings or similar areas within first layer 12 are created. These openings in first layer 12 will shape the support structures to be formed on substrate 10.

In this illustrative embodiment, it is assumed that openings 18 (FIG. 2) formed in this manner in first layer 12 preferably expose the top surface of substrate 10 and provide the shape of columns, rods, or other post-like structures. In this illustrated embodiment, these structures have a substantially circular cross-section normal to the top surface of substrate 10. As will be evident below, however, any useful geometrical shape or orientation relative to substrate 10 may be achieved in accordance with the invention.

Figure 2:
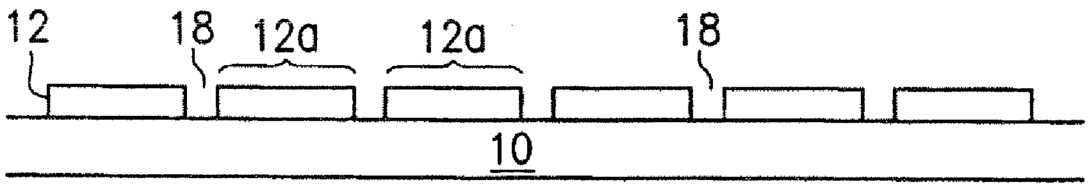

The device layer (21, 22) used as the initial support layer containing substrate 10, first layer 12, is "developed" using any of the well known fabrication techniques to remove the exposed photoresist and harden the remaining photoresist layer areas 12*a* (FIG. 2). Any additional steps known in the art can be utilized as necessary to remove any areas not covered by the hardened photoresist utilizing, for example, chemical solution or plasma (gas discharge) to etch away the extraneous material.

Figure 3:
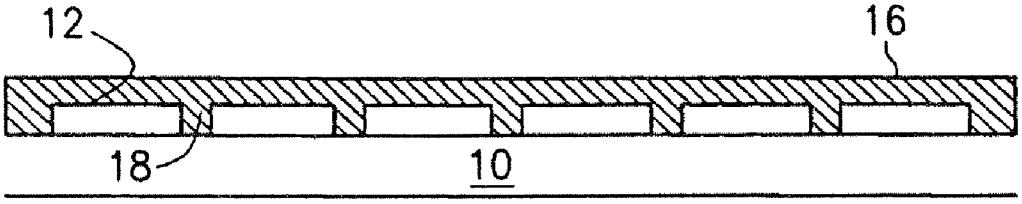

As shown in FIG. 3, a precursor material 16 is then deposited over first layer 12 and within openings 18. In accordance with a preferred embodiment of the invention, a "flow-fill" deposition technique, as described in Dobson et al., "Advanced $SiO_2$ Planarization Using Silane and $H_2O_2$," Semiconductor International, December 1994, pp. 85-88, and Gaillard et al., "Silicon Dioxide Chemical Vapor Deposition Using Silane and Hydrogen Peroxide," J. Vac. Sci. Technology, B 14(4), July/August 1996, pp. 2767-2769, which are both incorporated herein by reference in their entireties, is utilized to produce a homogenous and amorphous structure formed on substrate 10 at locations marked by openings 18.

In accordance with a preferred embodiment of the invention, the flow-fill deposition of layer 16 involves an initial cooling of substrate 10 (in a temperature range of 0-50° C., for this illustrated embodiment). Two separated reactive gases (e.g., one bearing silane ($SiH_4$) and the other bearing hydrogen peroxide ($H_2O_2$) and water) are then mixed to form a liquid glass layer to produce a wet film of sol-gel precursor ($Si(OH_4)$ and various dehydrated oligomers). This wet film is deposited over photoresist layer 12, filling the trenches provided by openings 18, as shown in FIG. 3. An additional baking or annealing step may be supplied to further harden the precursor layer. Furthermore, an expulsion step may be added to remove quantities of water from the spacers in accordance with the following reaction:

$$H[OSi(OH_2)]_nOH \rightarrow nSiO_2+(n+1)H_2O.$$

Figure 4:
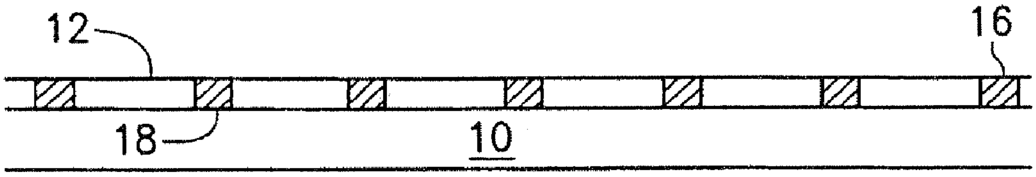
Figure 5:
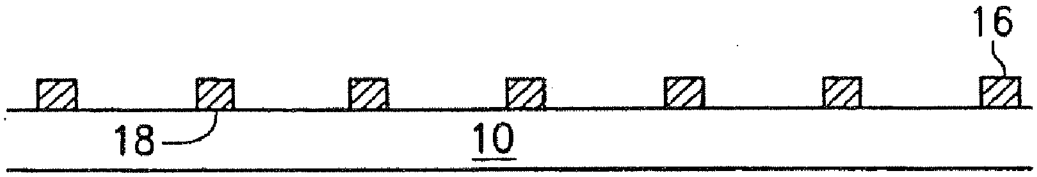

In accordance with a preferred embodiment, the device layer (21, 22) is then planarized utilizing any of the known techniques such as etching or chemical mechanical polishing (CMP). The planarization is performed to remove any portion of precursor 16 which extends beyond the height or level of photoresist layer 12, thus leaving the precursor only within openings 18, as shown in FIG. 4. Resist removal is performed using techniques well known in the art to strip photoresist layer 12 from the surface of substrate 10, leaving only the silicon dioxide spacers formed (in this illustrated embodiment) as one or more columns 16, as shown in FIG. 5. The device layer (21, 22) having the spacers 16 formed thereon can then be assembled with the other layer (21, 22) to form a multi-layer device having two layers 21, 22 separated by one or more spacers 16, as shown in FIG. 6.

Figure 7A:
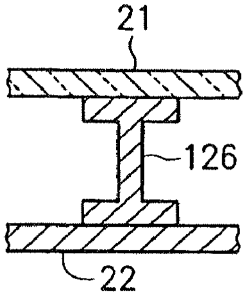
FIGS. 7(*a*), 7(*b*), and 7(*c*) illustrate cross-sectional views of additional devices fabricated in accordance with preferred embodiments of the invention.
Figure 7B:
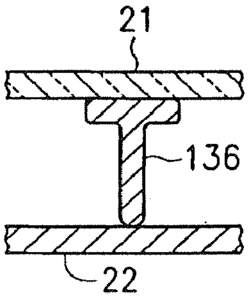
Figure 7C:
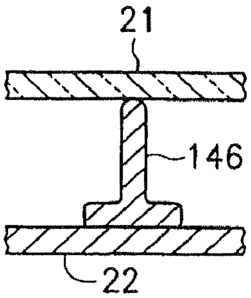
Figure 8A:
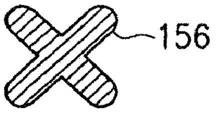
FIGS. 8(*a*) and 8(*b*) are top views of a spacer formed in accordance with a preferred embodiment of the invention.
Figure 8B:
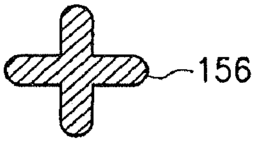
Figure 9:
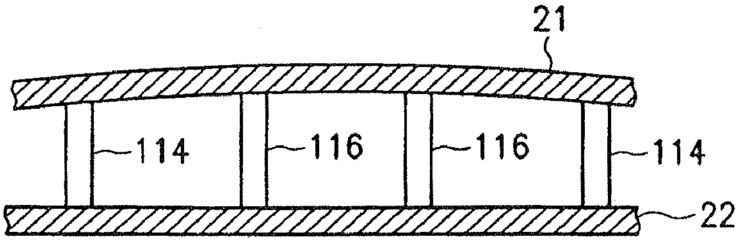
FIG. 9 is a cross-sectional view of a device employing a plurality of spacers in accordance with a preferred embodiment of the invention.

The support structure represented by spacer 16 in the embodiments described above can be formed as any one of a variety of different shapes and sizes in accordance with the preferred embodiments illustrated above. For example, the spacer can be formed as an I-shaped (or approximately I-shaped) structure 126 having wide end portions coupled to layers 21 and 22, as shown in FIG. 7(*a*). The spacer can also be formed in a T-shaped (or approximately T-shaped) structure with a wide end portion coupled to support layer 21 and a narrow end portion coupled to support layer 22, as shown by spacer 136 in FIG. 7(*b*), or alternatively, with a wide end portion coupled to support layer 22 and a narrow end portion coupled to support layer 21, as shown by spacer 146 in FIG. 7(*c*). The spacer can further be formed in an X-shaped structure 156, as shown in FIGS. 8(*a*) and 8(*b*).

When used to support or separate layers 21, 22 of a device, as discussed above, the spacers formed in accordance with a preferred embodiment of the invention are preferably uniformly distributed or located throughout the device, or may be irregularly distributed as desired. The spacers may have identical geometries (e.g., circular columns, X-shaped posts, etc.) with identical orientations, or may be varied in both geometry and orientation among the plurality of spacers used in the device. Moreover, the spacers formed in accordance with a preferred embodiment of the invention may be varied in height. For example, as shown by spacers 114, 116 in FIG. 9, spacers 116 in the center of the device may be longer than spacers 114 located toward the edges of the device.

Figure 10:
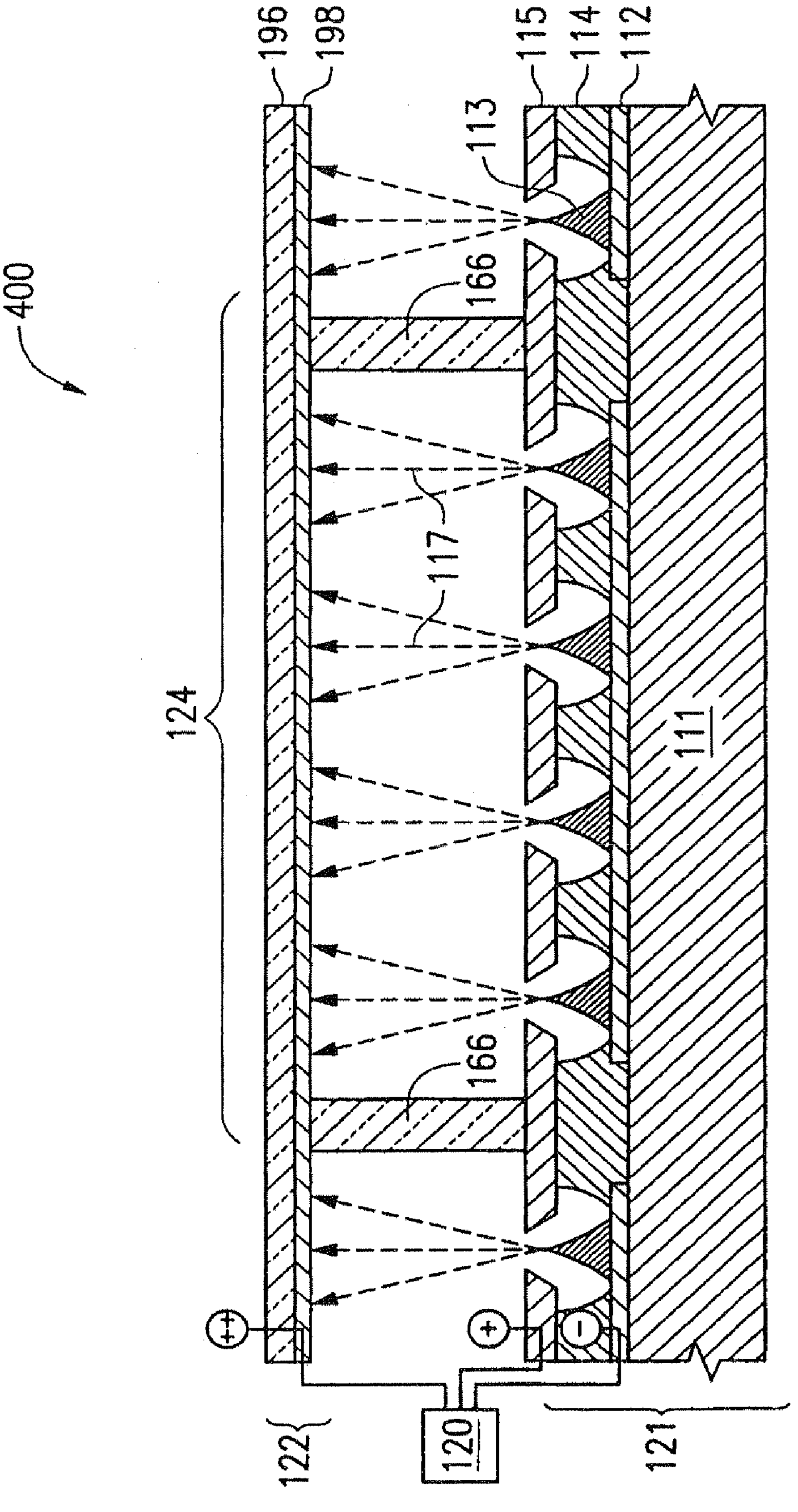
FIG. 10 is a cross-sectional view of a flat panel display in accordance with a preferred embodiment of the invention.

As illustrated in FIG. 10, spacer 116 formed in accordance with a preferred embodiment of the invention may be employed in a device such as flat panel display 400. As depicted in FIG. 10, flat panel display 400 is representative of a typical flat panel display having cathode 121 and anode 122. Cathode 121 is typically composed of substrate 111 made of single crystal silicon or glass. A conductive layer 112, such as doped polysilicon or aluminum, is formed on substrate 111. Conical emitters 113 are formed on conductive layers 112. Surrounding emitters 113 are a dielectric layer 114 and a conductive extraction grid 115 formed over dielectric layer 114. A power source 120 is typically provided to apply a voltage differential between conductive layers 112 and grid 115 such that electrons 117 bombard pixels 124 of anode (faceplate) 122. Faceplate 122 typically employs a transparent dielectric 196, a transparent conductive layer 198, and a black matrix grille (not shown) formed over conductive layer 198 for defining regions for phosphor coating.

In accordance with a preferred embodiment of the invention, spacer 166 may be formed on, for example, a support layer in the form of anode (or faceplate) 122 during fabrication of faceplate 122 for use in flat panel display 400. After formation of spacer 166 and faceplate 122, flat panel display 400 can be assembled by joining faceplate 122 and cathode 121 together as separated by spacers 166, as shown in FIG. 10, and the display vacuum sealed in a manner well known in the art.

Figure 11:
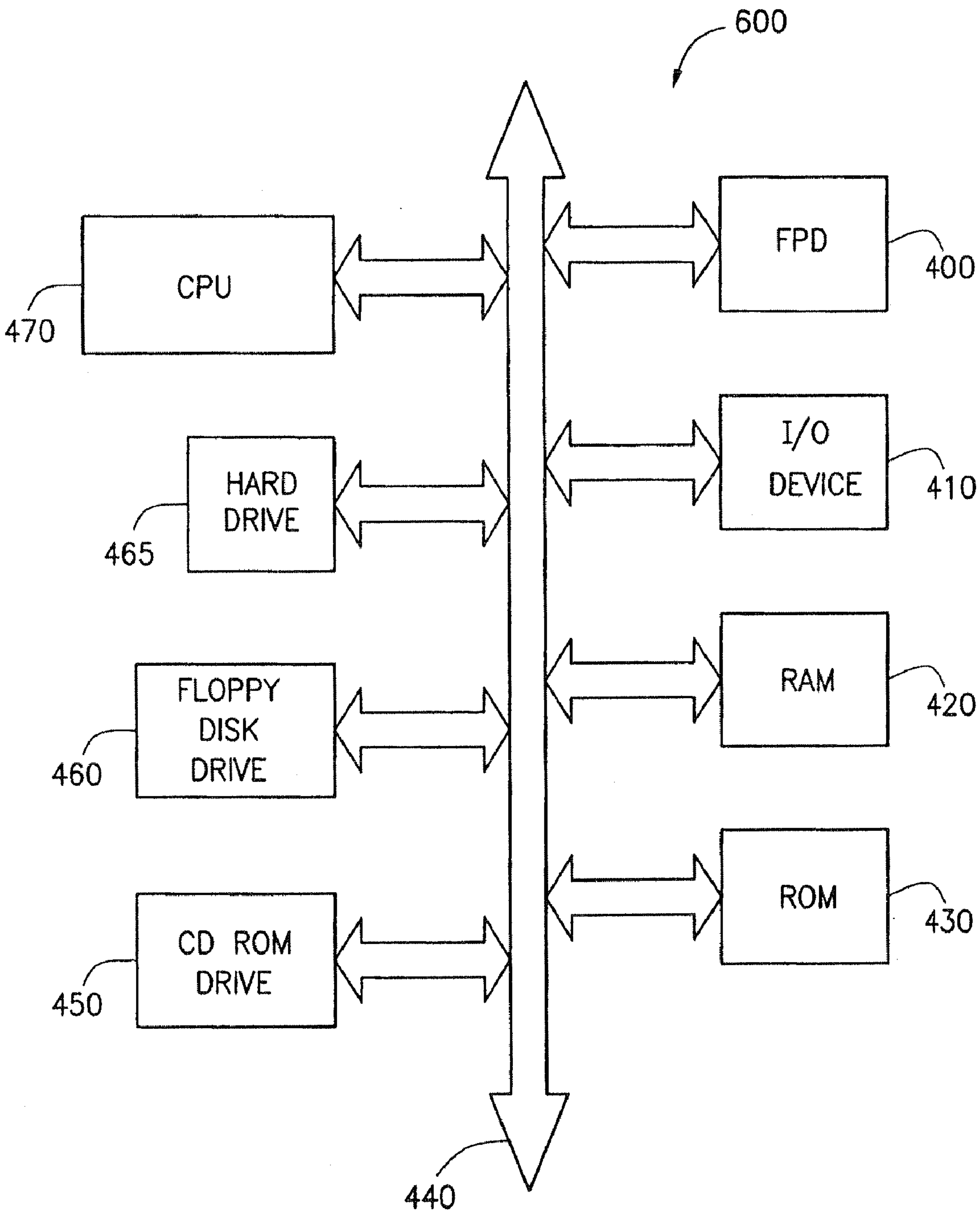
FIG. 11 is a processor system in accordance with a preferred embodiment of the invention.

The flat panel display (FPD) 400 thus assembled in accordance with a preferred embodiment of the invention may be utilized as a display device in a processor system 600, as shown in FIG. 11. In accordance with a preferred embodiment, processor-based system 600 may be a computer system, a process control system, or any other system employing a processor and associated display devices. The processor-based system includes a central processing unit (CPU) 470 (e.g., microprocessor) that communicates with I/O device 410 over bus 440. The processor-based system 600 also includes random access memory (RAM) 420, read only memory (ROM) 430, CD ROM drive 450, floppy disk drive 460, and hard drive 465 which all communicate with CPU 470 (and each other) over bus 440 in a manner well known in the art.

While preferred embodiments of the invention have been described and illustrated, it should be apparent that many modifications to the embodiments and implementations of the invention can be made without departing from the spirit or scope of the invention. For example, the spacers may be coupled directly to faceplate and grid 115, as shown in FIG. 10 (or directly on substrate 111) of cathode 121. Although in the embodiments illustrated above it was assumed that the anode or faceplate layer of the flat panel display was to be used as the initial supporting structure, it is understood that the cathode could alternatively be used as the initial supporting structure. Although the use of a single photosensitive material in the form of photoresist layer 12 (FIG. 1) was utilized in the illustrated embodiments, it should be apparent that other photoresist layers or multiple photoresist layers (negative or positive resists) could be used for creating the desired geometrical shape openings in photoresist layer 12 in accordance with the invention.

Typically, the Novolac or phenolic-type resin used in display manufacturing exhibits hydroxyl functions which will promote wetting of the flow-fill film layer employed in the illustrated embodiments described above. As an alternative, the resin may be pretreated with a conformal layer of chemical vapor deposit (CVD) oxide or other layer before the flow-fill deposition step is performed. In addition, the wet film used in the "flow-fill" deposition step may be obtained as a by product in the reaction of tetraethyloxysilicate (TEOS) with $H_2O$ and optionally $N_2O$, $O_2$, $O_3$, $H_2O_2$.

Moreover, the initial device layer (e.g., the faceplate) may be prepared by depositing an underlayer using plasma enhanced chemical vapor deposition (PECVD) prior to performing the flow-fill depositing step. The same (or similar) PECVD process may be used to provide an oxide capping layer over the spacers on the initial device (or faceplate) layer after the flow-fill depositing step. In addition, it should be readily apparent that the flow-fill deposition step illustrated above may also involve other glass-like material such as B or P doped $SiO_2$.

What is claimed is:

1. A method of forming a structure on a display component, comprising:

depositing photoresist on the display component;

forming an opening in the photoresist, wherein the opening extends to the substrate; and flow-fill depositing a substantially liquid sol-gel precursor in the opening.

2. The method of forming a structure on a display component as recited in claim 1, wherein the flow-fill depositing step further comprises depositing silicon dioxide ($SiO_2$) doped with a material from the group of boron (B) and phosphor (P).

3. The method of forming a structure on a display component as recited in claim 1, wherein the flow-fill depositing step comprises:

initially cooling the display component;

mixing separated reactive gases; and depositing a sol-gel precursor over the photoresist.

4. The method of forming a structure on a display component as recited in claim 3, wherein the flow-fill depositing step comprises initially cooling the display component to a temperature between 0° C. and 50° C.; mixing silane ($SiH_4$) gas and hydrogen peroxide ($H_2O_2$); and depositing a wet-film sol-gel precursor in the opening of the photoresist.

5. The method of forming a structure on a display component as recited in claim 1, wherein the flow-fill depositing step comprises initially cooling the display component to a temperature between 0° C. and 50° C.

6. The method of forming a structure on a display component as recited in claim 1, further comprising forming structures having a substantially circular cross-section normal to the surface of the substrate.

7. A method of fabricating a flat panel display having a cathode and a faceplate, comprising:

depositing a first photoresist on the faceplate;

depositing a patterned second photoresist on the first photoresist, wherein the second photoresist exposes a portion of the first photoresist;

exposing the second photoresist and the portion of the first photoresist to a light source;

removing exposed portions of the first and second photoresist, wherein removing defines an opening in the first photoresist down to the faceplate;

flow-fill depositing a wet sol-gel on the first photoresist and in the opening;

baking the sol-gel into a solid silicon oxide;

removing the silicon oxide on the first photoresist while retaining the silicon oxide in the opening;

removing remains of the first photoresist while retaining remains of the silicon oxide; and assembling the flat panel display with the cathode and the faceplate separated by the spacers.

8. The method in claim 7, wherein the act of removing the silicon oxide comprises planarizing.

9. The method in claim 7, further comprising prior to the act of flow-fill depositing a wet sol-gel, depositing an underlayer on the faceplate.

10. The method in claim 9, wherein the act of depositing an underlayer on the faceplate is performed using plasma enhanced chemical vapor deposition (PECVD).

11. The method in claim 10, further comprising after the act of flow-fill depositing a wet sol-gel, forming an oxide capping layer over the spacers on the faceplate using PECVD.

* * * * *